(12) United States Patent
Conner et al.

(10) Patent No.: US 6,398,175 B1
(45) Date of Patent: Jun. 4, 2002

(54) METHOD AND APPARATUS FOR PROVIDING A LASER DETECTOR CLAMP APPARATUS WITH REVERSIBLE JAW ADAPTER

(75) Inventors: Robert G. Conner, New Carlisle; Chris W. Snyder, Greenville, both of OH (US)

(73) Assignee: Apache Technologies, Inc., Dayton, OH (US)

( * ) Notice: Subject to any disclaimer, the term of this patent is extended or adjusted under 35 U.S.C. 154(b) by 0 days.

(21) Appl. No.: 09/747,633

(22) Filed: Dec. 22, 2000

Related U.S. Application Data
(60) Provisional application No. 60/173,613, filed on Dec. 29, 1999.

(51) Int. Cl.[7] .............................................. A47B 96/06
(52) U.S. Cl. ..................................... 248/228.3; 403/385
(58) Field of Search ........................... 248/228.3, 229.12, 248/229.22, 230.3, 231.41, 229.13, 229.15, 229.25, 228.6, 230.6, 231.71; 403/164 385

(56) References Cited

U.S. PATENT DOCUMENTS

| | | | |
|---|---|---|---|
| 81,764 A | 9/1868 | Fisher | |
| 259,945 A | 6/1882 | Thomas | |
| 550,443 A | * 11/1895 | Deal | 108/146 |
| 1,604,100 A | 10/1926 | Kenerson | |
| 1,737,989 A | 12/1929 | Wollenschlager | |
| 2,174,947 A | 10/1939 | Ramsey | |
| 3,745,638 A | 7/1973 | Minera | |
| 3,861,664 A | 1/1975 | Durkee | |
| 4,404,873 A | 9/1983 | Radish | |
| 4,767,110 A | 8/1988 | Yang | |
| 5,401,354 A | 3/1995 | Colucci | |
| 5,553,963 A | * 9/1996 | Hoy et al. | 403/164 |
| 5,733,061 A | 3/1998 | Child | 403/385 |
| 5,842,671 A | * 12/1998 | Gibbs | 248/231.41 |

* cited by examiner

*Primary Examiner*—Ramon O. Ramirez
(74) *Attorney, Agent, or Firm*—Frederick H. Gribbell; James P. Davidson

(57) ABSTRACT

A hand-held laser detector clamp apparatus is provided for use in attachment against virtually all available sizes and shapes of members found on construction sites and in surveying applications. A reversible jaw adapter that contains both a "flat" face and a "ramped" face is attached to a travelling clamp jaw with a clamp lead screw. The reversible jaw adapter can be used with either its flat face out or its ramped face out. A detector bracket and detector screw are also provided as part of the clamp apparatus to hold a hand-held laser detector in place. If the flat face of the reversible jaw adapter is oriented so as to be "out," then the clamp apparatus will generally be most useable in attaching to flat surfaces, such as rectangular rods or boards. When the ramped face of the reversible jaw adapter is "out," then the clamp apparatus can be used for attachment against a variety of different member shapes, such as round rods, oval rods, and certain sizes of rectangular rods. To use the reversing feature of the clamp apparatus, the travelling clamp jaw is backed away using the clamp lead screw from whatever surface or member that the clamp apparatus is presently attached against. After the clamp apparatus has become free, the adapter screw is loosened to an extent that the reversible jaw adapter becomes free from the travelling clamp jaw. After that has occurred, the orientation of the reversible jaw adapter is manually reversed, then the adapter screw is tightened to hold the reversible jaw adapter in place against the travelling clamp jaw. Now the clamp apparatus is ready for use in clamping against a different size or shape of member.

25 Claims, 18 Drawing Sheets

METHOD AND APPARATUS FOR PROVIDING A LASER DETECTOR CLAMP APPARATUS WITH REVERSIBLE JAW ADAPTER

This Appln claims benefit of Prov. Ser. No. 60/173,613 filed Dec. 29, 1999.

TECHNICAL FIELD

The present invention relates generally to construction and surveying equipment and is particularly directed to a clamping apparatus of the type which holds a laser light detector to a structural member. The invention is specifically disclosed as a laser detector clamp apparatus that includes a reversible jaw adaptor which allows a single clamp apparatus to be attached to virtually all shapes and sizes of structural members and rods typically found on a construction job site.

BACKGROUND OF THE INVENTION

Hand-held laser detectors are regularly used in construction and surveying applications, and at certain times these hand-held laser detectors are desirably clamped or otherwise securely attached to some structural member of a job site, including a building structure. This structural member can take many forms, including different sizes and shapes of grade rods, such as round rods, oval rods, and rectangular rods. In addition, such a device may be desirably attached to some type of I-beam, or boards.

Existing methods for securely attaching a hand-held laser detector to some building member usually consist of a travelling jaw (much like a vise), or a C-clamp methodology. In both of these arrangements, the moving jaw is tightened with a lead screw. In the case of the travelling jaw methodology, the lead screw does not translate as it is turned. In the case of the C-clamp methodology, the lead screw does translate as it is turned.

In general, the fixed and moving jaws used in the two above-noted conventional methodologies are flat and parallel to one another. Some existing clamps are designed with a "ramped" jaw on the moving piece, and a "flat" jaw on the fixed piece. This allows clamping to limited sizes of round and oval shapes, and also to some rectangular shapes. However, none of these approaches work well on all available rod shapes and sizes. In fact, some manufacturers of conventional clamps make different clamps for different rod shapes.

SUMMARY OF THE INVENTION

Accordingly, it is a primary advantage of the present invention to provide a laser detector clamp apparatus that can be used with virtually all available shapes and sizes of rods used on job sites in construction and surveying applications. It is another advantage of the present invention to provide a detector clamp apparatus having a reversible jaw adapter that allows attachment to rectangular rods and beams, or flat boards when the "flat" side of the jaw adapter is facing out; or to be attached against round, oval, or some rectangular shapes when the "ramped" side of the jaw adapter is facing out—which allows the customer to attach the laser detector equally well to a variety of rod shapes and sizes while using a single clamp apparatus. It is a further advantage of the present invention to provide a laser detector clamp having a reversible jaw adapter in which the user may change the orientation of the jaw adapter by removing a screw holding the jaw adapter in place (or unlatching or unsnapping the jaw adapter to become loose), reversing the orientation of the jaw adapter, and then re-attaching the jaw adapter with the screw (or re-latching or snapping the jaw adapter back into position).

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an improved hand-held laser detector clamp apparatus is provided having a reversible jaw adapter that contains both a "flat" face and a "ramped" face, for use in attachment against virtually all available sizes and shapes of members found on construction sites and in surveying applications. The clamp apparatus includes a main clamp frame that holds a travelling clamp jaw with a clamp lead screw, or some other type of translation mechanism. A reversible jaw adapter is attached to the clamp jaw by an adapter screw, and this reversible jaw adapter can be attached with either its flat face out or its ramped face out. A detector bracket and detector screw are also provided as part of the clamp apparatus to hold a hand-held laser detector in place. As an alternative construction, the present invention could eliminate the adapter screw altogether by substituting a latching mechanism therefor, or perhaps by making the reversible jaw adapter of a configuration so that it is inserted into the clamp jaw by a press fit or by a snapping action.

If the flat face of the reversible jaw adapter is oriented so as to be "out," then the clamp apparatus will generally be most useable in attaching to flat surfaces, such as rectangular rods or boards. When the ramped face of the reversible jaw adapter is "out," then the clamp apparatus can be used for attachment against a variety of different member shapes, such as round rods, oval rods, and certain sizes of rectangular rods. Moreover, irregularly-shaped members could also be generally attached against the clamp apparatus while using the reversible jaw adapter with its ramped face out.

To use the reversing feature of the clamp apparatus, the travelling clamp jaw is backed away using the clamp lead screw (or other translation mechanism) from whatever surface or member that the clamp apparatus is presently attached against. After the clamp apparatus has become free, the adapter screw is loosened to an extent that the reversible jaw adapter becomes free from the travelling clamp jaw. After that has occurred, the orientation of the reversible jaw adapter is manually reversed, then the adapter screw is tightened to hold the reversible jaw adapter in place against the travelling clamp jaw. Now the clamp apparatus is ready for use in clamping against a different size or shape of member. Alternatively, the reversible jaw adapter can be released from the clamp jaw by unlatching a latching mechanism, or by unsnapping or pushing out and away from a press fit with the clamp jaw.

A further alternative construction could be provided by which the reversible jaw adapter is mounted directly onto the clamp frame instead of on the travelling clamp jaw. Another further alternative construction could be provided in which the clamp lead screw (or other translation mechanism) actually translates with the travelling clamp jaw, as in a "C-clamp"-type construction.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
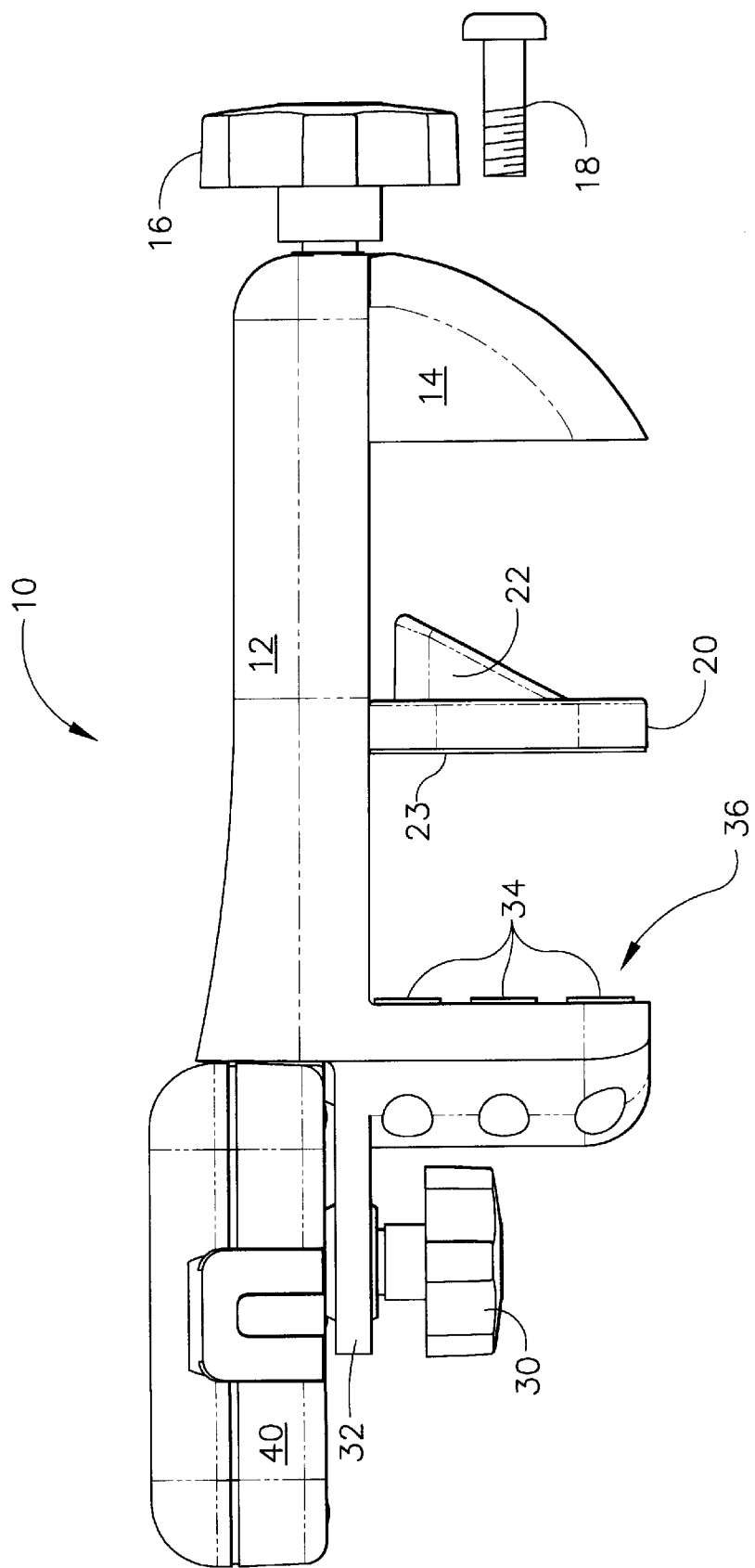
FIG. 1 is a front elevational view of a laser detector clamp apparatus as constructed according to the principles of the present invention, in which the reversible jaw adapter is positioned with its flat face out.

Referring now to the drawings, FIG. 1 shows a hand-held laser detector clamp apparatus generally designated by the reference numeral 10. A clamp frame (or main body) is located at reference numeral 12, and a detector bracket 32 is used to support a hand-held laser detector at 40. A detector screw 30 is used to hold the hand-held detector 40 in place against the detector bracket 32.

A travelling clamp jaw 14 can be driven left and right (as viewed on FIG. 1) by a clamp lead screw 16. This can be seen in greater detail on FIG. 2. A reversible jaw adapter, generally designated by the reference numeral 20, is viewed on FIG. 1 as being a separate component from the travelling clamp jaw 14. However, reversible jaw adapter 20 is designed to mate against the travelling clamp jaw 14, as will be seen in some of the later views.

Reversible jaw adapter 20 contains a triangular protrusion at 22, and on its opposite side exhibits a substantially "flat face" as seen at the reference numeral 23. This flat face 23 can be used to snug up against and then "clamp" to a relatively flat exterior member, which will thereby allow the laser detector 40 to be held in place in a particular orientation with respect to that member. This will be explained in greater detail, hereinbelow. A set of rubber bumpers are also provided at 34, which will also be used to snug up against and abut the exterior member. These rubber bumpers 34 make up an "end surface," generally designated by the reference number 36 of the jaw mechanism of clamp 10, and it will be understood that these rubber bumpers could be entirely eliminated from the design and replaced by one or more solid surfaces, without departing from the principles of the present invention.

The triangular protrusion 22 and the flat face 23 represent side surfaces that each can be used to abut and clamp against the exterior member, such as a bar or rod, as described in greater detail below. Both "side surfaces" 22 and 23 have different shapes from one another, so as to be more useful in clamping against several different shapes of exterior members without requiring additional parts of the clamp 10. It will be understood that both side surfaces 22 and 23 (as well as other surfaces of the illustrated embodiment) could be somewhat altered in precise shape without departing from the principles of the present invention, including curved surfaces such as circular or elliptical arcs, or stepped or grooved surfaces. Moreover, the surfaces could be either smooth or rough.

As the illustrated embodiment is viewed from a direction that is transverse to a direction of movement of said travelling clamp jaw (e.g., as seen in FIG. 1), the flat face 23 is a "first shape" of the side surfaces and is a substantially flat surface at an orthogonal angle. From this same viewing direction (i.e., transverse to a direction of movement of said travelling clamp jaw), the triangular protrusion 22 represents a "second shape" of the side surfaces and also is a substantially flat surface, but not at an orthogonal angle. This feature of the present invention allows a single reversible jaw adapter 20 to abut to and clamp up against many different shapes of objects, as will be more fully described below.

The reversible jaw adapter 20 is placed against the travelling clamp jaw 14, and an adapter screw 18 is used to hold these two members together. This can be seen in greater detail in FIGS. 2 and 3. In an alternative construction, the jaw adapter 20 could be joined to the travelling clamp jaw 14 by use of a latching mechanism (not shown) or by snapping the jaw adapter 20 into place, or even by use of a "press fit" into the travelling clamp jaw 14. Later, when it is desired to reverse the orientation of jaw adapter 20, it could be unscrewed (using the adapter screw 18), unlatched, unsnapped, or pushed out from a press fit away from the travelling clamp jaw 14. As illustrated in the later figures (starting with FIG. 7), it can be seen that the jaw adapter 20 makes up the opposite "end surface" of the jaw mechanism of clamp 10, for snugging up against and abutting the exterior member. It will be understood that the reversible jaw adapter 20 could also be provided with rubber bumpers, or the like, if desired, or that the clamping surfaces of the reversible jaw adaptor 20 could comprise multiple smaller surfaces rather than one continuous larger surface (as illustrated in the figures).

Figure 2:
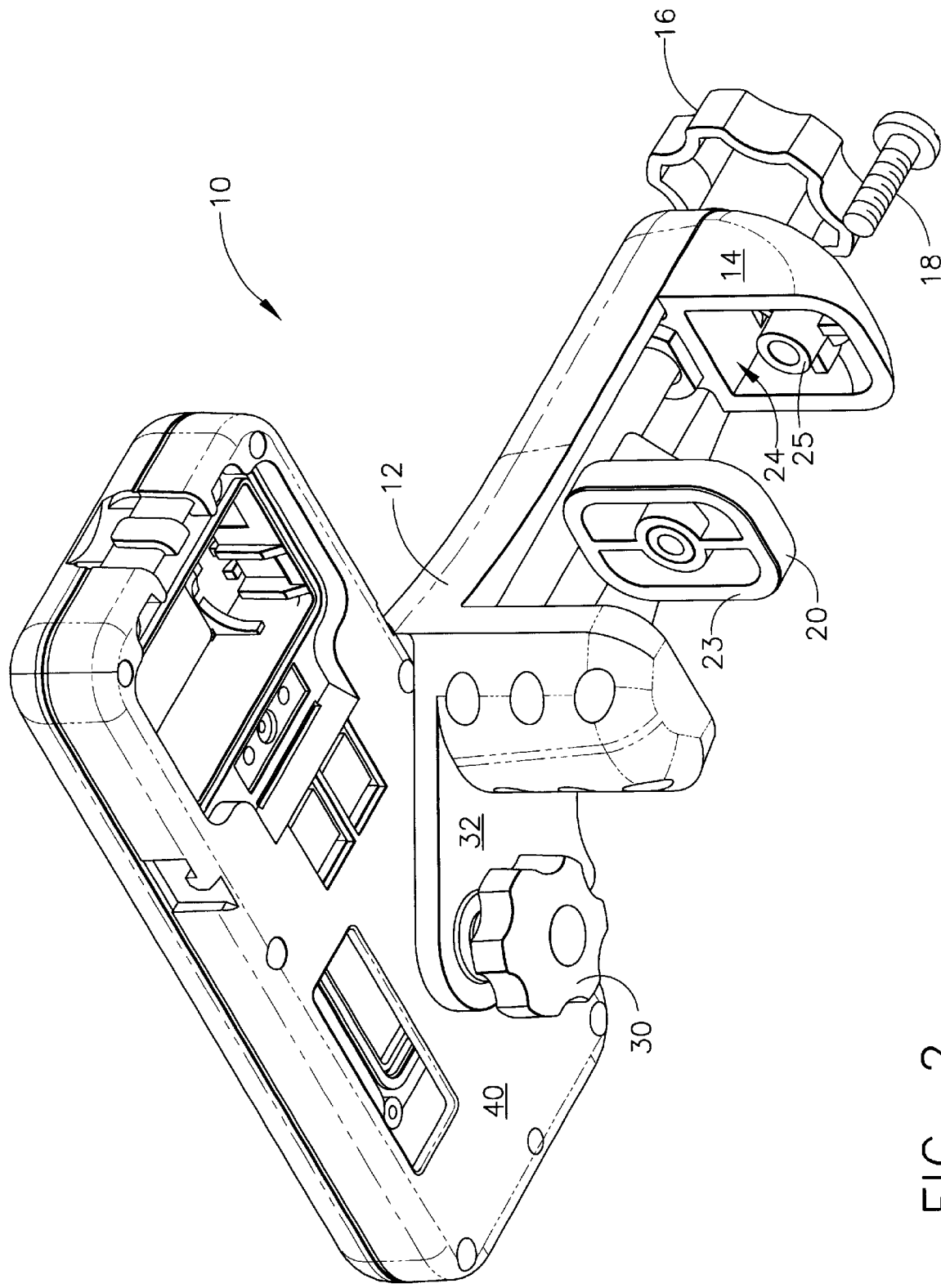
FIG. 2 is a perspective view from the below left of the laser detector clamp apparatus depicted in FIG. 1.

On FIG. 2, greater detail of the illustrated embodiment can be observed with respect to the workings of the clamp lead screw 16 and the travelling clamp jaw 14. In addition, some of the construction details of the preferred embodiment can be easily seen with respect to the reversible jaw adapter 20 and an internal open volume at 24 within the travelling clamp jaw 14. The protrusion 22 of the reversible jaw adapter 20 is preferably designed to fit within this internal open volume 24, thereby allowing reversible jaw adapter 20 to fit snugly against the travelling clamp jaw 14. This will be more readily seen in some of the later views.

As illustrated on FIG. 1, the clamp lead screw 16 does not "travel" along with the movement of the travelling clamp jaw 14. However, it will be understood that clamp lead screw 16 could be constructed in a different configuration without departing from the principles of the present invention, and for example, could translate as in a standard "C-clamp" along with the travelling clamp jaw 14. It will be further understood that the clamp lead screw 16 could be entirely replaced by another type of translation mechanism altogether, such as a linear racheting mechanism or a linear friction latching mechanism that requires a manual release to be actuated to disengage the clamping action—for example, the linear catches on door dampers, or linear squeezing devices used in caulking guns; or a toggle clamp mechanism, or another type of over-center clamping mechanism.

Figure 18:
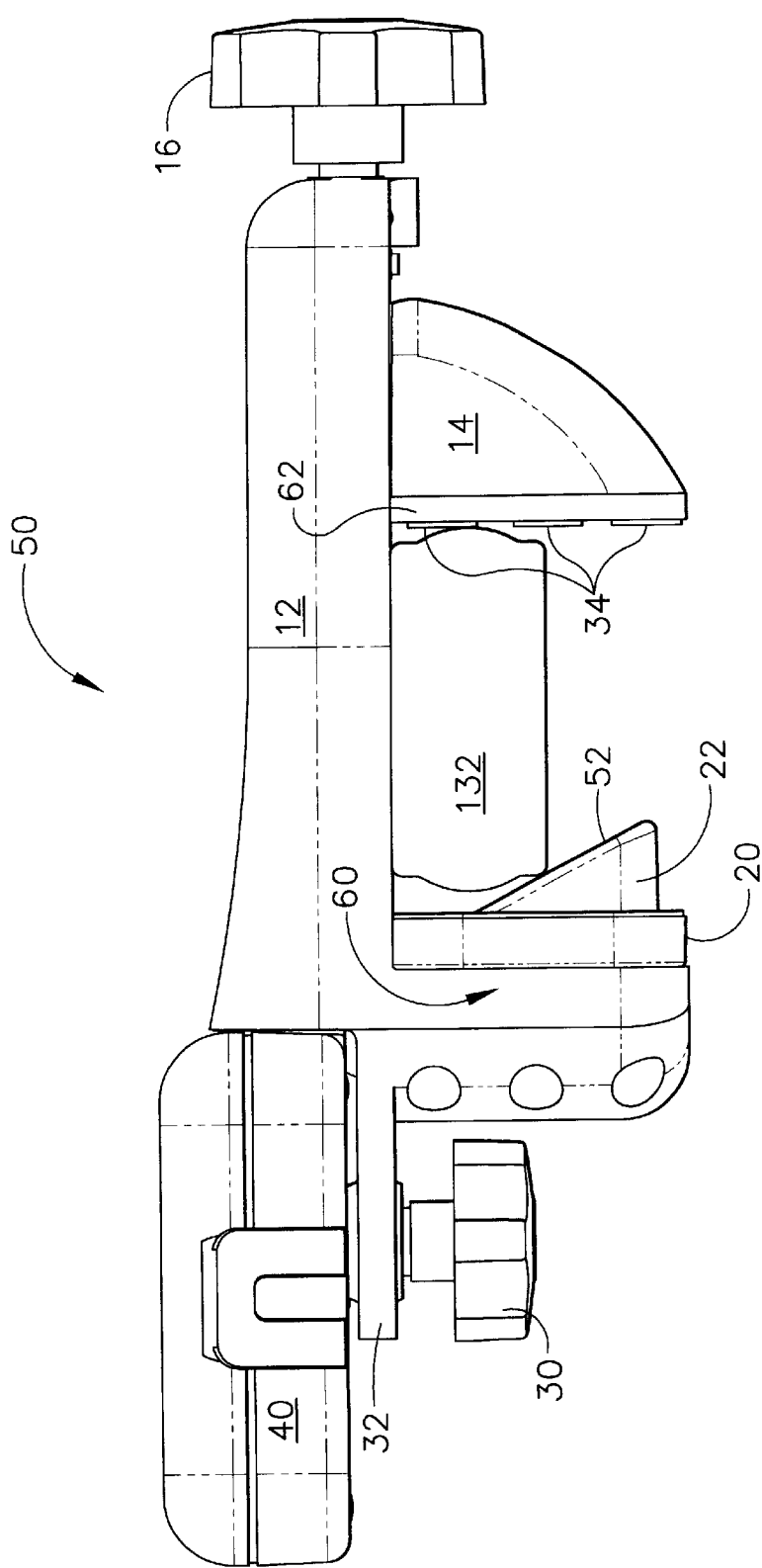
FIG. 18 is a front elevational view of the laser detector clamp apparatus of FIG. 4 in which the reversible jaw adapter is clamped against a small oval rod, and in which the reversible jaw adapter is located directly to the clamp frame.

Moreover, it will be understood that the configuration illustrated in FIGS. 7–15, in which the jaw adapter 20 is attached to the travelling clamp jaw 14, could be modified without departing from the principles of the present invention, and for example, the jaw adapter 20 could instead be constructed to "fit" into the portion at reference numeral 60 (on FIG. 18) of the clamp frame 12. This would have an appearance as illustrated in FIG. 18, for example, and in FIG. 18 it can be seen that the jaw adapter 20 is directly mounted against the clamp frame 20. Of course, this portion 60 of clamp frame 12 would be of a shape to receive the angled portion 22 of the jaw adapter 20 when the jaw adapter is reversed in orientation (i.e., the portion 60 would receive the "ramped face" 52 of jaw adapter 20). In this alternative construction, the rubber bumpers provided at 34 would be located on the opposite side of the smaller oval rod 132, and could be mounted to a relatively thin member 62 that either is part of, or is in mechanical contact with, the travelling clamp jaw 14.

Figure 3:
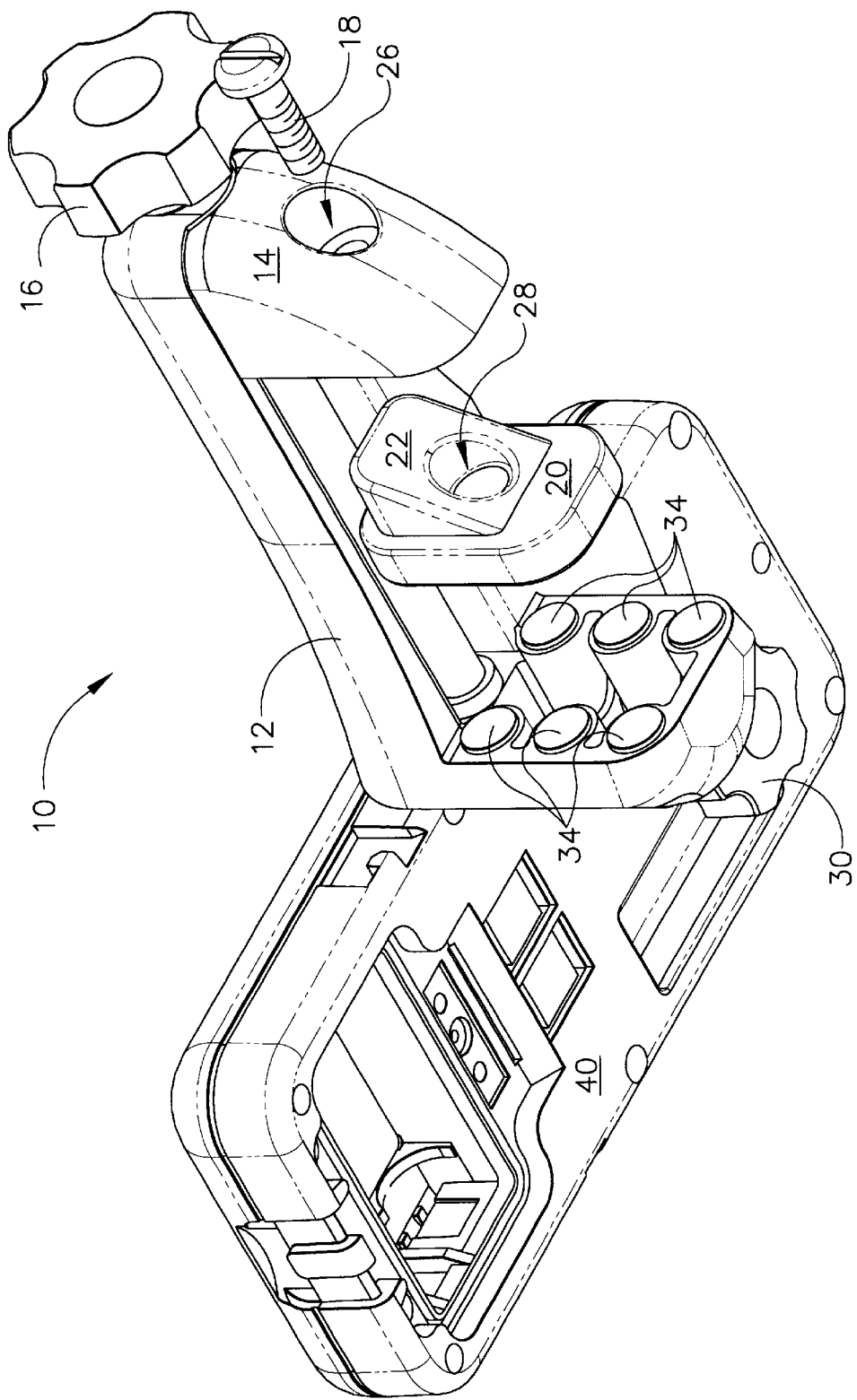
FIG. 3 is a perspective view from the below right of the laser detector clamp apparatus depicting in FIG. 1.

FIG. 3 also provides some greater detail of the construction of the reversible jaw adapter 20 and the travelling clamp jaw 14. The adapter screw 18 is designed to fit through a screw recess 26 in clamp jaw 14, and also to protrude into the reversible jaw adapter 20 in a threaded relationship. In addition, a cylindrical boss 25 of clamp jaw 14 is designed to protrude into a recess 28 of the reversible jaw adapter 20. This enables the protrusion 22 to fit within the internal volume 24 of clamp jaw 14 while the adapter screw 18 is threaded into reversible jaw adapter 20, and while the adapter screw 18 has its screw head abut against a surface within the screw recess 26 of clamp jaw 14.

The six different rubber bumpers 34 are also plainly visible on FIG. 3. The orientation of the detector screw 30 with respect to clamp frame 12 and the hand-held laser detector 40 is also visible on FIG. 3.

Figure 4:
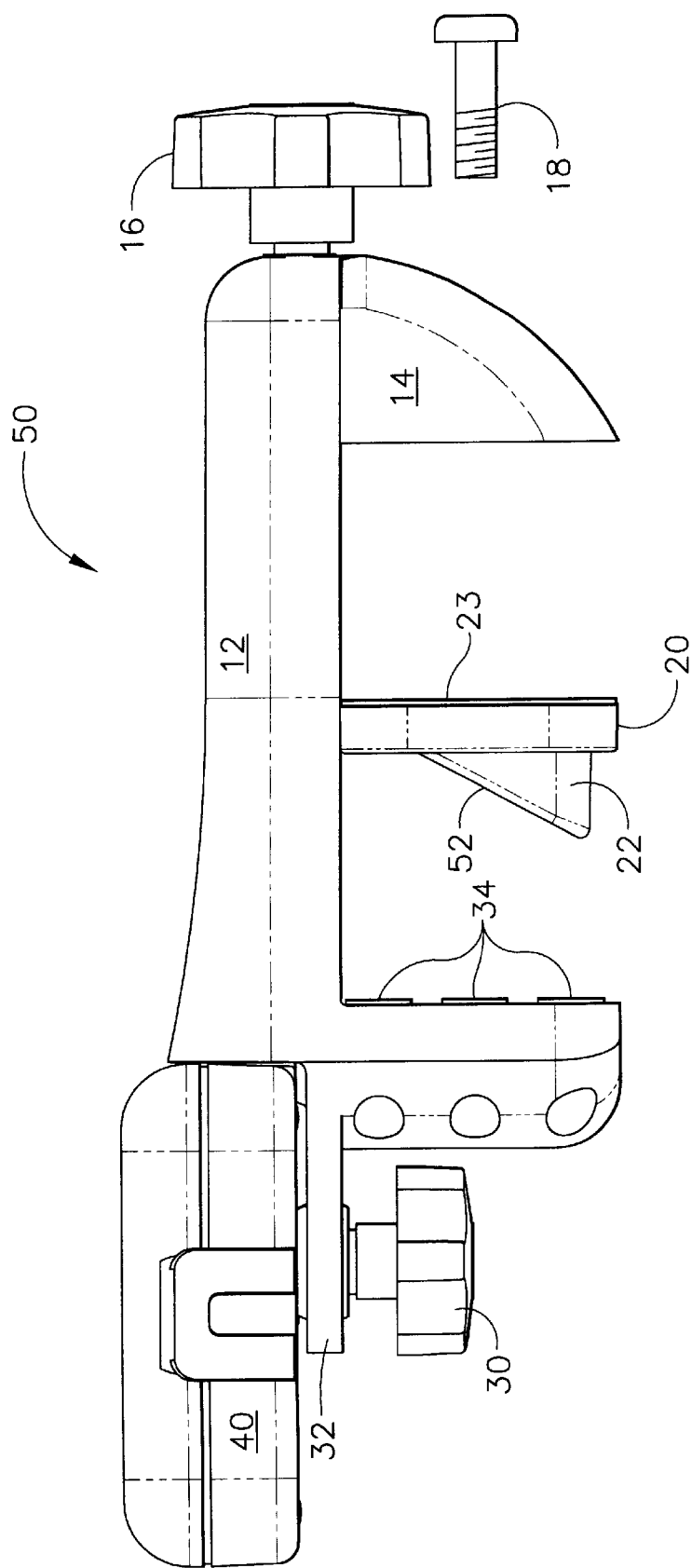
FIG. 4 is a front elevational view of a laser detector clamp apparatus as constructed according to the principles of the present invention, in which the reversible jaw adapter is positioned with its ramped face out.

FIG. 4 illustrates a hand-held laser detector clamp apparatus generally designated by the reference numeral 50. This clamp 50 is virtually identical in construction to the clamp 10 illustrated on FIG. 1. The only significant difference is that the reversible jaw adapter 20 has been re-oriented so that its protrusion 22 is now pointing to the left, as seen on FIG. 4. This triangular protrusion 22 now exhibits a ramped face at 52 that can be used to hold against and clamped to objects of various different shapes. This will be easily demonstrated in the later views.

It will be understood that the ramped face 52 of the triangular protrusion 22 could be reversed in slope (not shown) to connect the clamp 10 onto a structure, without departing from the principles of the present invention. In such a configuration, the slope of the ramped face 52 would be in the opposite direction from that illustrated in FIG. 4 (i.e., it could have a negative slope from left-to-right, instead of the positive slope that is illustrated). This alternative configuration of the ramped face 52 may not seem to be as useful; however, the clamp 10 can be designed for use with many different types of structural members, and not every such possible structure is illustrated in the figures herein.

The other components of the detector clamp apparatus 50 are identical to those of the clamp 10 as depicted in FIG. 1. In this orientation, the reversible jaw adapter 20 will have its substantially flat surface 23 abut the travelling clamp jaw 14 when it is time to be used to hold the clamp apparatus 50 in place against a member.

Figure 5:
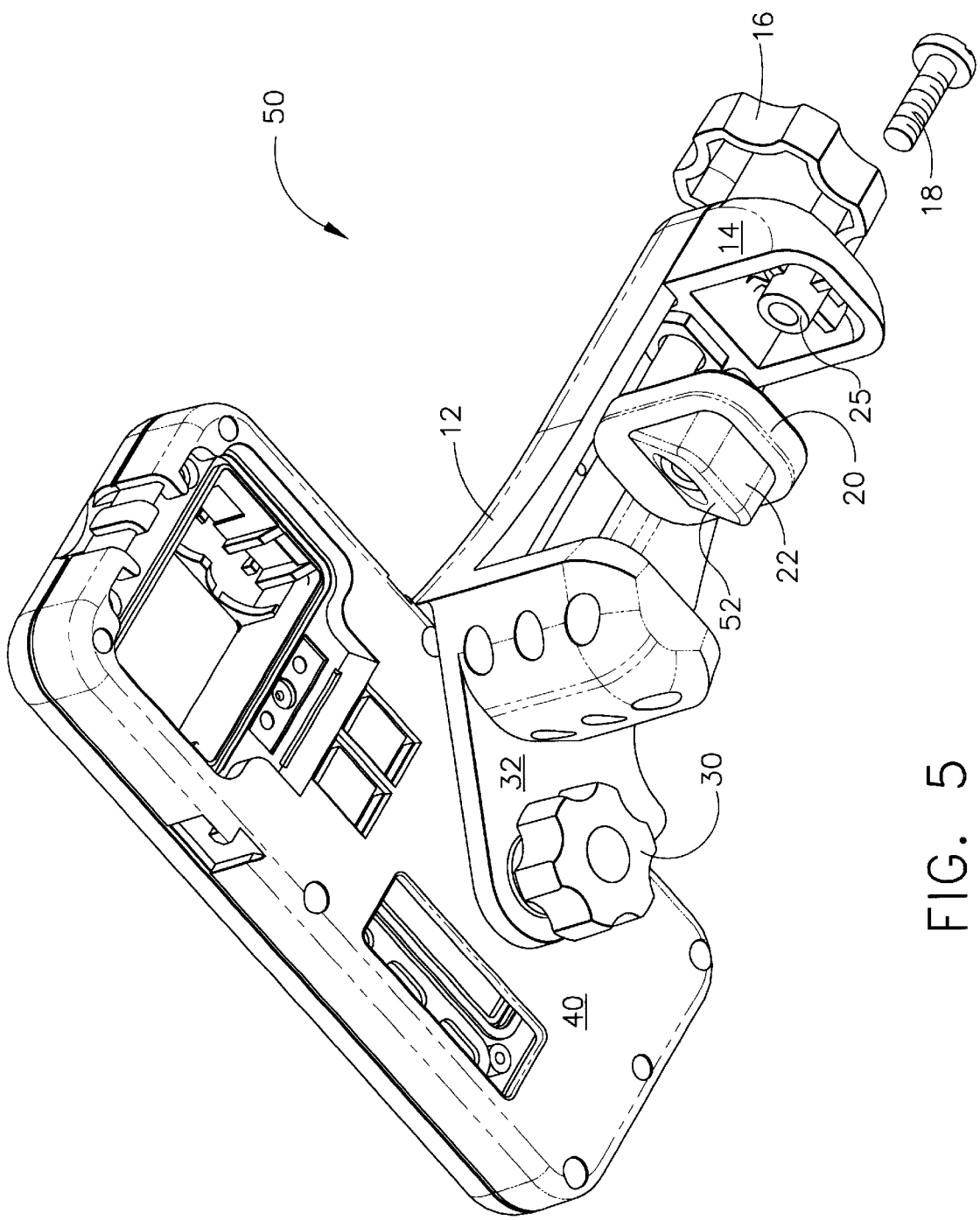
FIG. 5 is a perspective view from the below left of the laser detector clamp apparatus depicted in FIG. 4.
Figure 6:
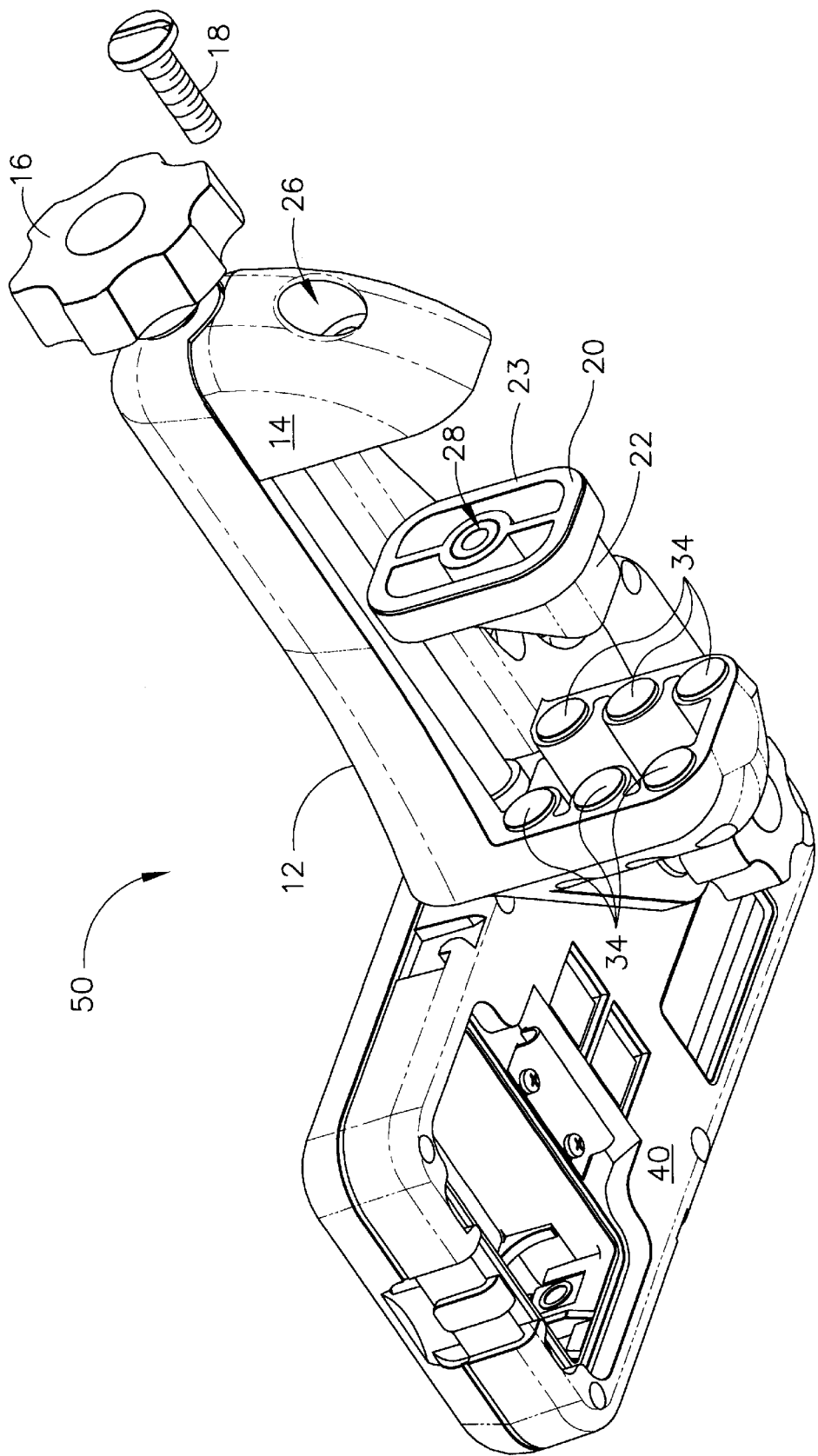
FIG. 6 is a perspective view from the below right of the laser detector clamp apparatus depicted in FIG. 4.

FIG. 5 shows greater construction details of the preferred embodiment of the clamp apparatus 50, including the cylindrical boss 25 that is part of travelling clamp jaw 14. As can be seen in FIG. 5, the adapter screw 18 will protrude through the inner open diameter of the cylindrical boss 25 to make a threaded engagement with the reversible jaw adapter 20. This can also be seen in FIG. 6, in which the adapter screw 18 protrudes through the screw recess 26 of clamp jaw 14, and then into the threaded engagement of the recess 28 of the reversible jaw adapter 20. The rubber bumpers 34 are also plainly visible on FIG. 6, as are the other components that are essentially identical to those depicted in FIG. 3.

Figure 7:
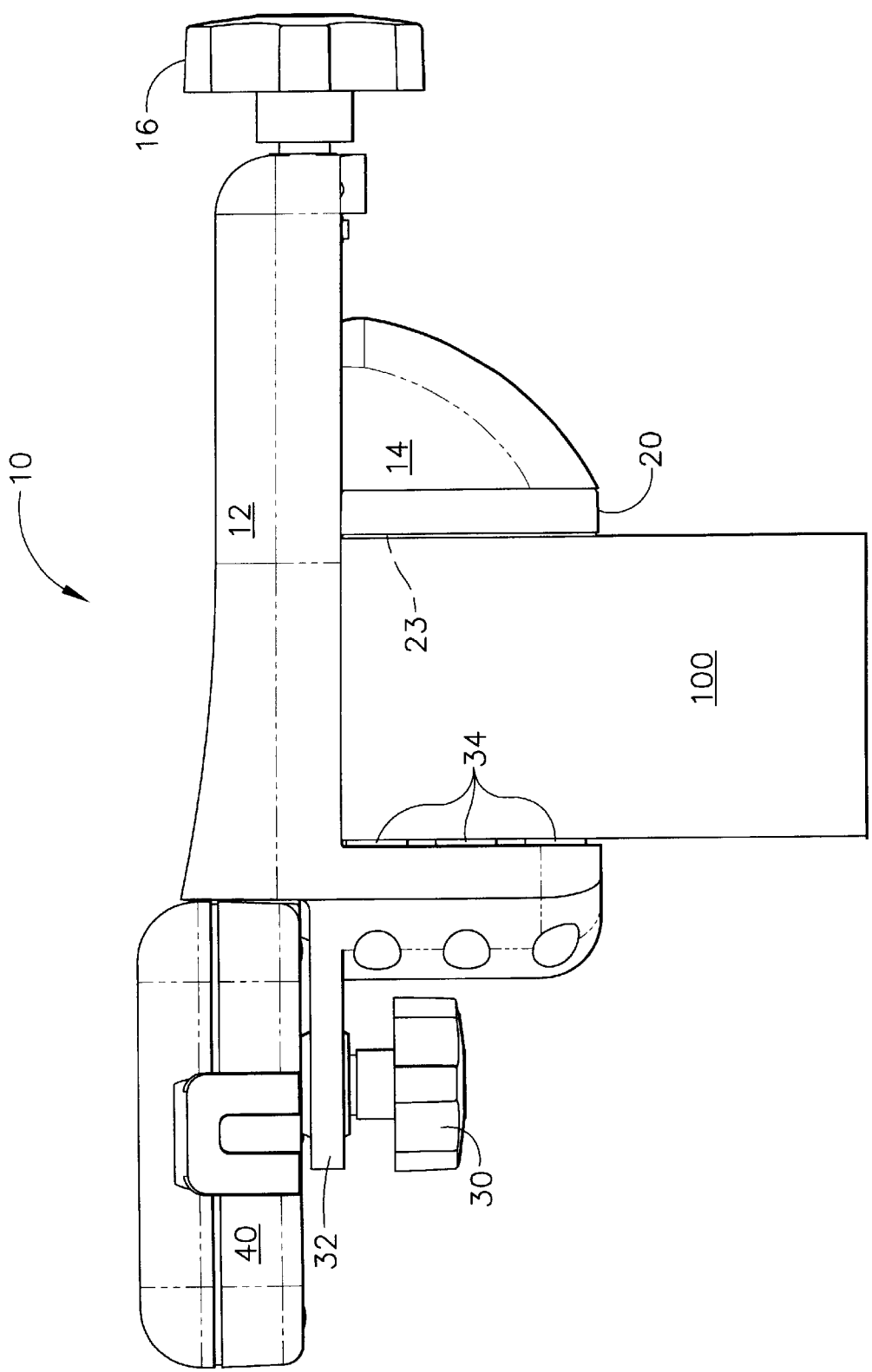
FIG. 7 is a front elevational view of the laser clamp apparatus of FIG. 1, showing the reversible jaw adapter clamped against a rectangular rod.

On FIG. 7 the laser detector clamp 10 is illustrated as being clamped against a substantial rectangular structural member, generally designated by the reference numeral 100. The flat face 23 of reversible jaw adapter 20 is tightened against one of the flat surfaces of the member 100 by the combination of the travelling clamp jaw 14 and the clamp lead screw 16. The opposite surface of member 100 is thereby firmly pressed against the rubber bumpers 34, thereby holding the clamp apparatus 10 against member 100. Once placed into this position, the hand-held laser detector 40 will remain in this orientation with respect to the member 100.

Figure 8:
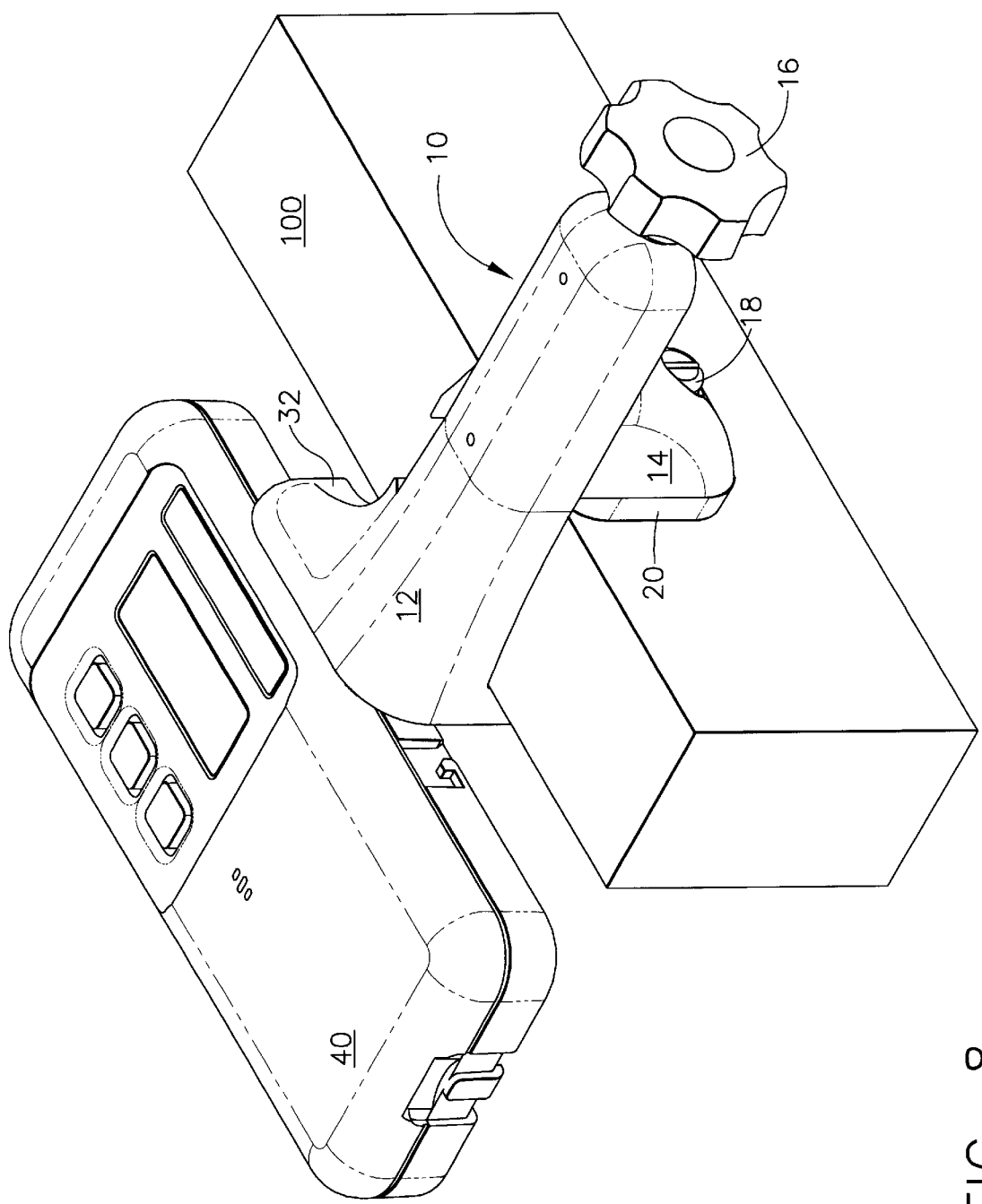
FIG. 8 is a perspective view from the above right of the laser detector clamp apparatus of FIG. 7.

FIG. 8 depicts the same member 100 in a perspective view. In addition, the adapter screw 18 is visible in FIG. 8.

Member 100 could be a board structure, or some other type of rectangular material.

Figure 9:
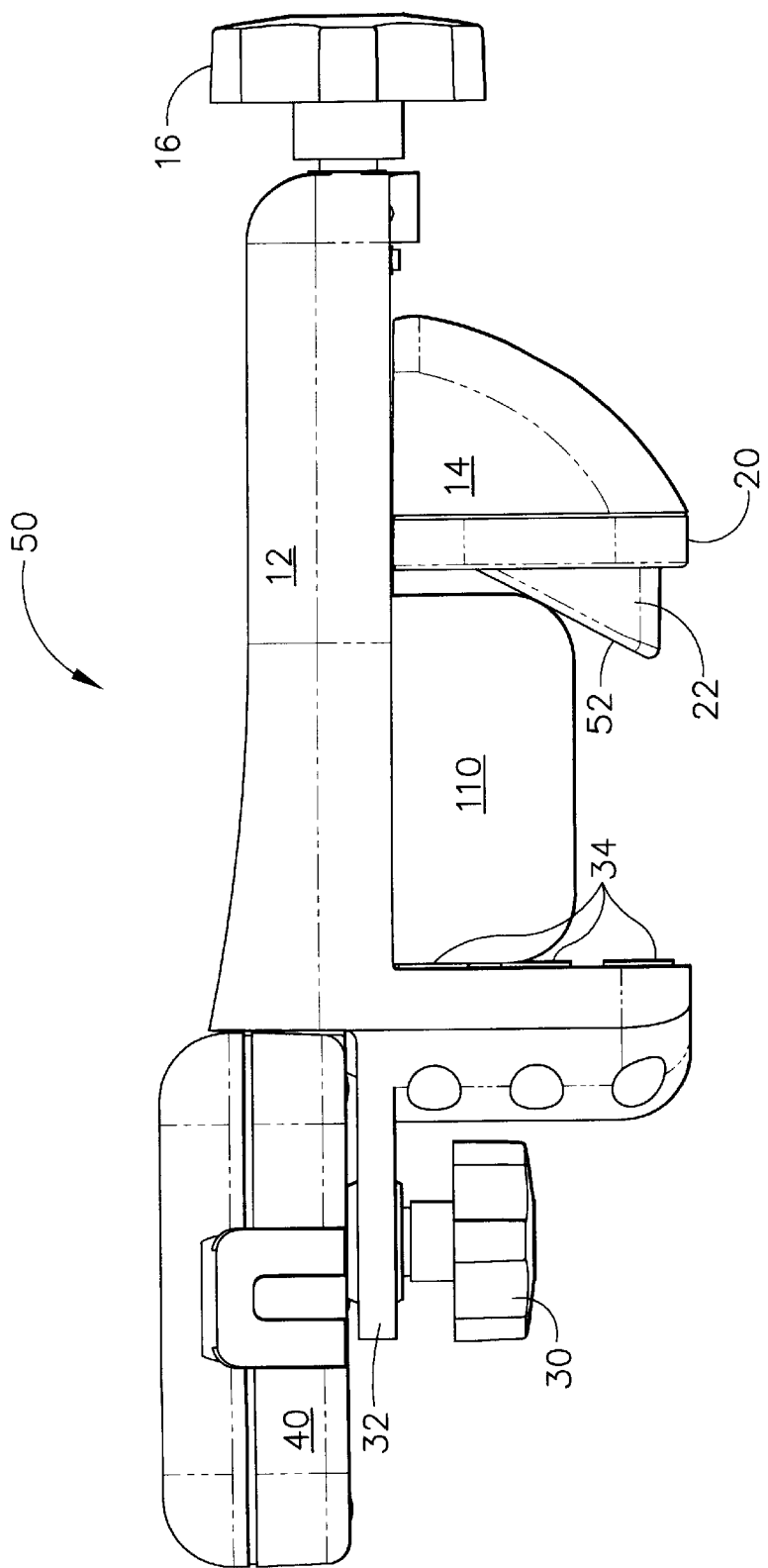
FIG. 9 is a front elevational view of the laser detector clamp apparatus of FIG. 4 in which the reversible jaw adapter is clamped against a large rectangular rod.

FIG. 9 illustrates the clamp apparatus 50 as it is held in place against a rather large rectangular rod, generally designated by the reference numeral 110. As can be seen in FIG. 9, the ramped face 52 of the triangular protrusion 22 is moved into a position that forces the opposite surface of the rectangular rod 110 against two of the rubber bumpers 34. In this configuration, there is a small air gap between the near surface of the rectangular rod 110 and the reversible jaw adapter 20.

Figure 10:
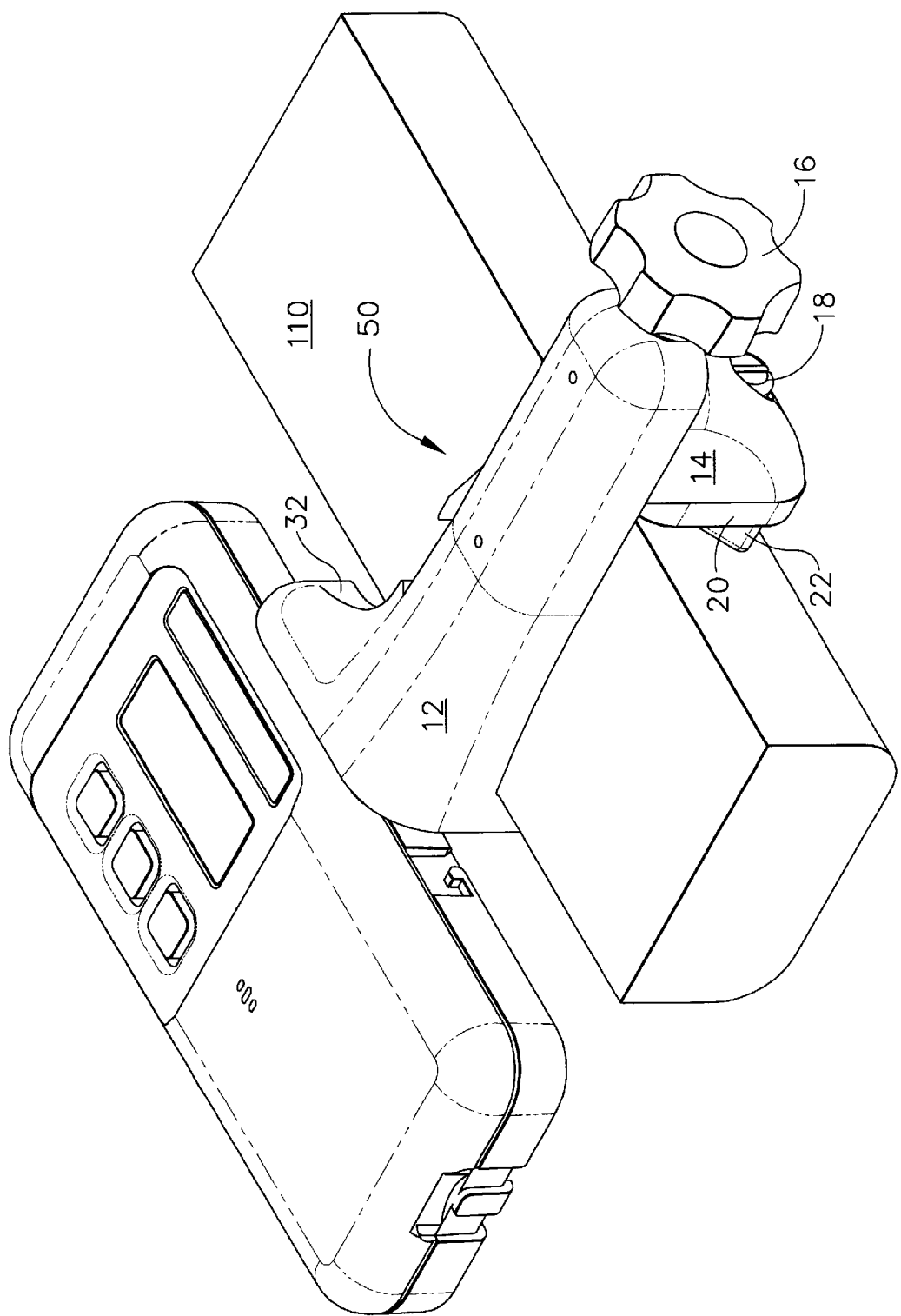
FIG. 10 is a perspective view from the above right of the laser detector clamp apparatus of FIG. 9.

FIG. 10 is a perspective view also illustrating the rather large rectangular rod 110 in position with the clamp apparatus 50, after clamp 50 has been fixed in place by the combination of the reversible jaw adapter 20, clamp jaw 14, and clamp lead screw 16.

Figure 11:
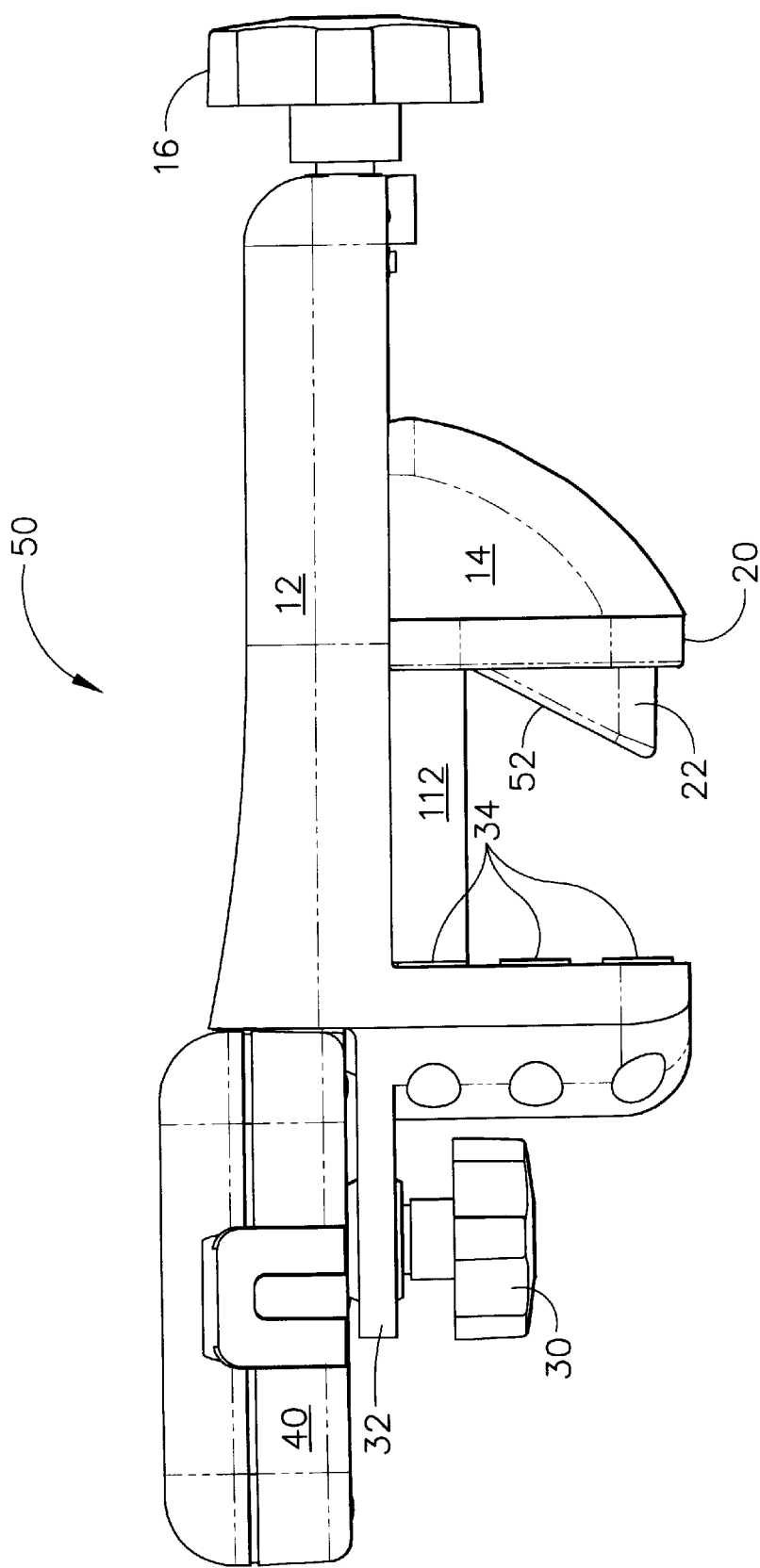
FIG. 11 is a front elevational view of the laser detector clamp apparatus of FIG. 4 in which the reversible jaw adapter is clamped against a small rectangular rod.

FIG. 11 illustrates the same clamp apparatus 50 being used to hold against a smaller rectangular rod, generally designated by the reference numeral 112. In this arrangement, the rod 112 is held against one of the rubber bumpers 34, and also against the non-ramped face on the same side of the jaw adapter 20 as the protrusion 22. If the rectangular rod 112 were much larger, then it would come into contact with the ramped face 52.

As can be seen by comparing FIGS. 7 and 9, the reversible jaw adapter 20 can be used to hold against more than one type of shape, merely by changing its orientation as it is abutted against the travelling clamp jaw 14. This type of reversing jaw adapter arrangement is unique, and makes the use of the detector clamp very flexible with respect to holding against various types of building structural members.

To use the reversible features of this reversible jaw adapter 20, the clamping equipment is merely unclamped from one type of building structure (such as the member 100 of FIG. 7, and the reversible jaw adapter 20 is allowed to come free from the travelling clamp jaw 14 by loosening the adapter screw 18. Once adapter screw 18 has been loosened to a sufficient extent, the reversible jaw adapter 20 can be manually detached from its previous engagement against the travelling clamp jaw 14, and then adapter 20 can then be reversed in orientation, and placed back into an abutting relationship against the travelling clamp jaw 14. In this example, the reversible jaw adapter 20 started with its triangular protrusion 22 contained within the internal open volume 24 (see FIG. 2) of the clamp jaw 14, and after being reversed, this triangular protrusion 22 will now be exposed and facing to the left, as seen on FIG. 9.

Now in this position, the reversible jaw adapter 20 is forced to remain in an abutting relationship with the travelling clamp jaw 14 by the operator manually tightening the adapter screw 18. Once this has been accomplished, the clamp jaw 14 and reversible jaw adapter 20 combination will become a single mechanical member that can be used to clamp against building members of various shapes and sizes.

Figure 12:
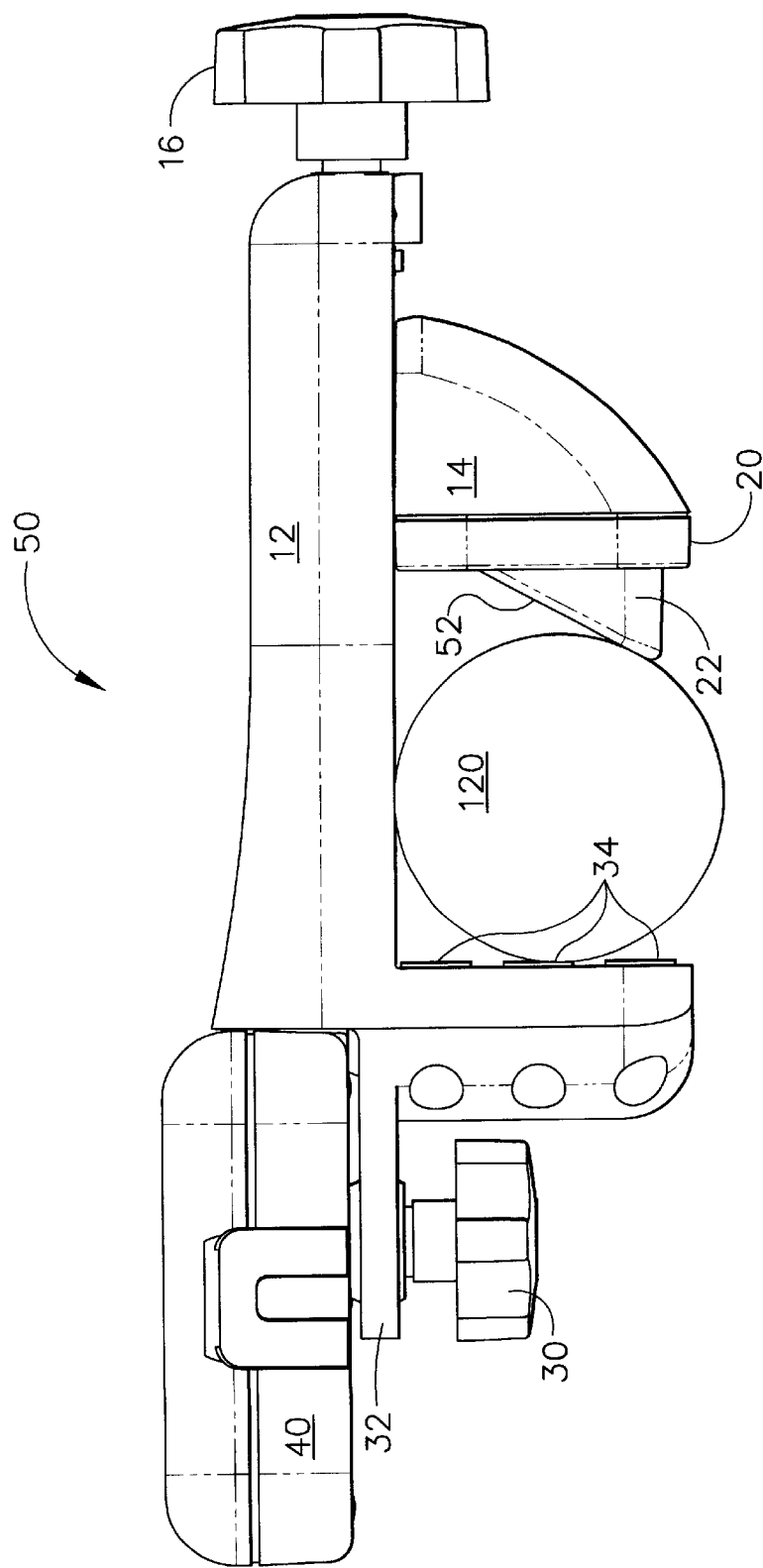
FIG. 12 is a front elevational view of the laser detector clamp apparatus of FIG. 4 in which the reversible jaw adapter is clamped against a large round rod.

FIG. 12 illustrates the hand-held laser detector clamp apparatus 50 as being used in conjunction with a rather large round rod, generally designated by the reference numeral 120. One side of the round rod is held against the rubber bumpers 34, while on the opposite side a portion of the round rod's surface is held in position against the ramped face 52 of the triangular protrusion 22 of the reversible jaw adapter 20.

Figure 13:
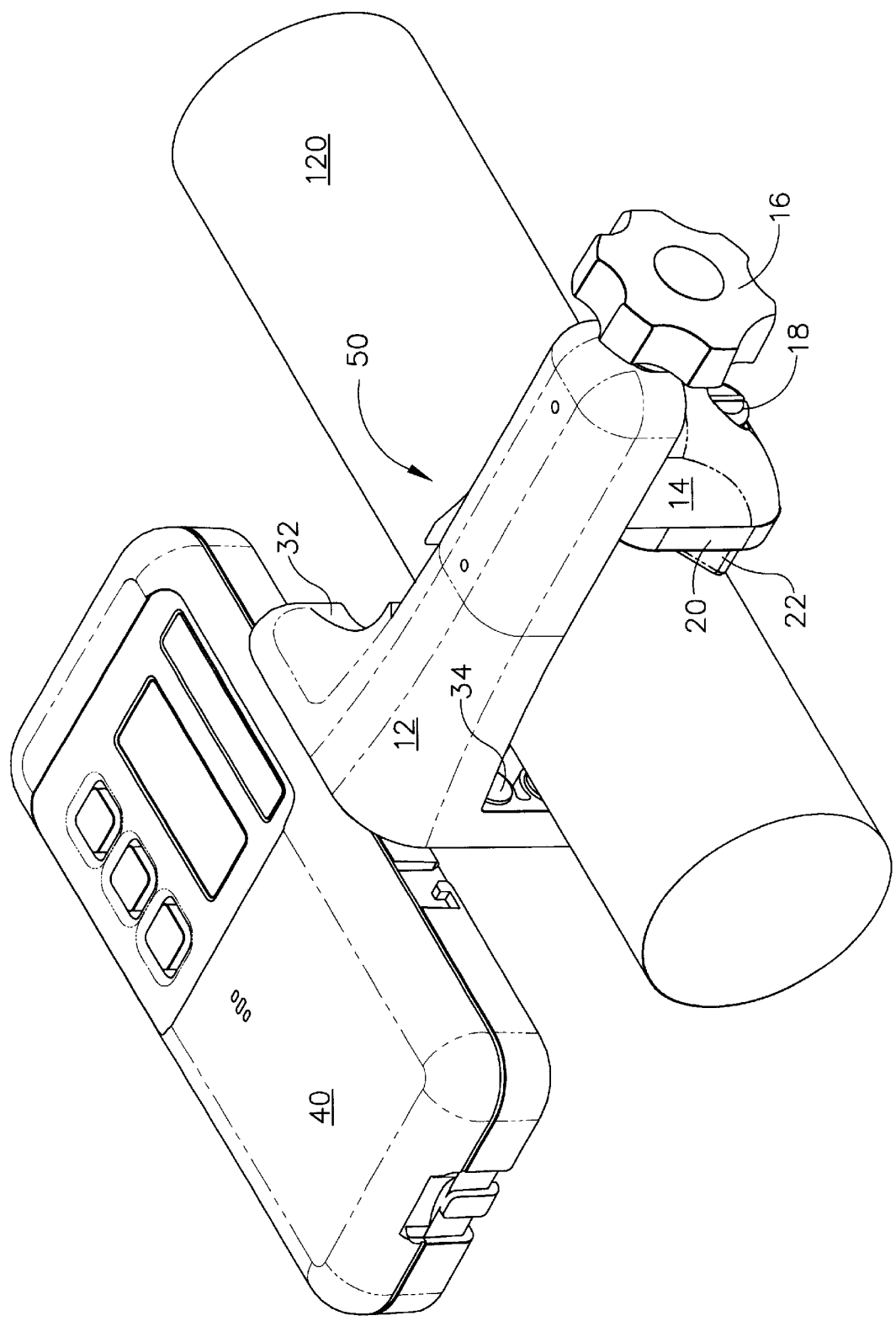
FIG. 13 is a perspective view from the above right of the laser detector clamp apparatus of FIG. 12.
Figure 14:
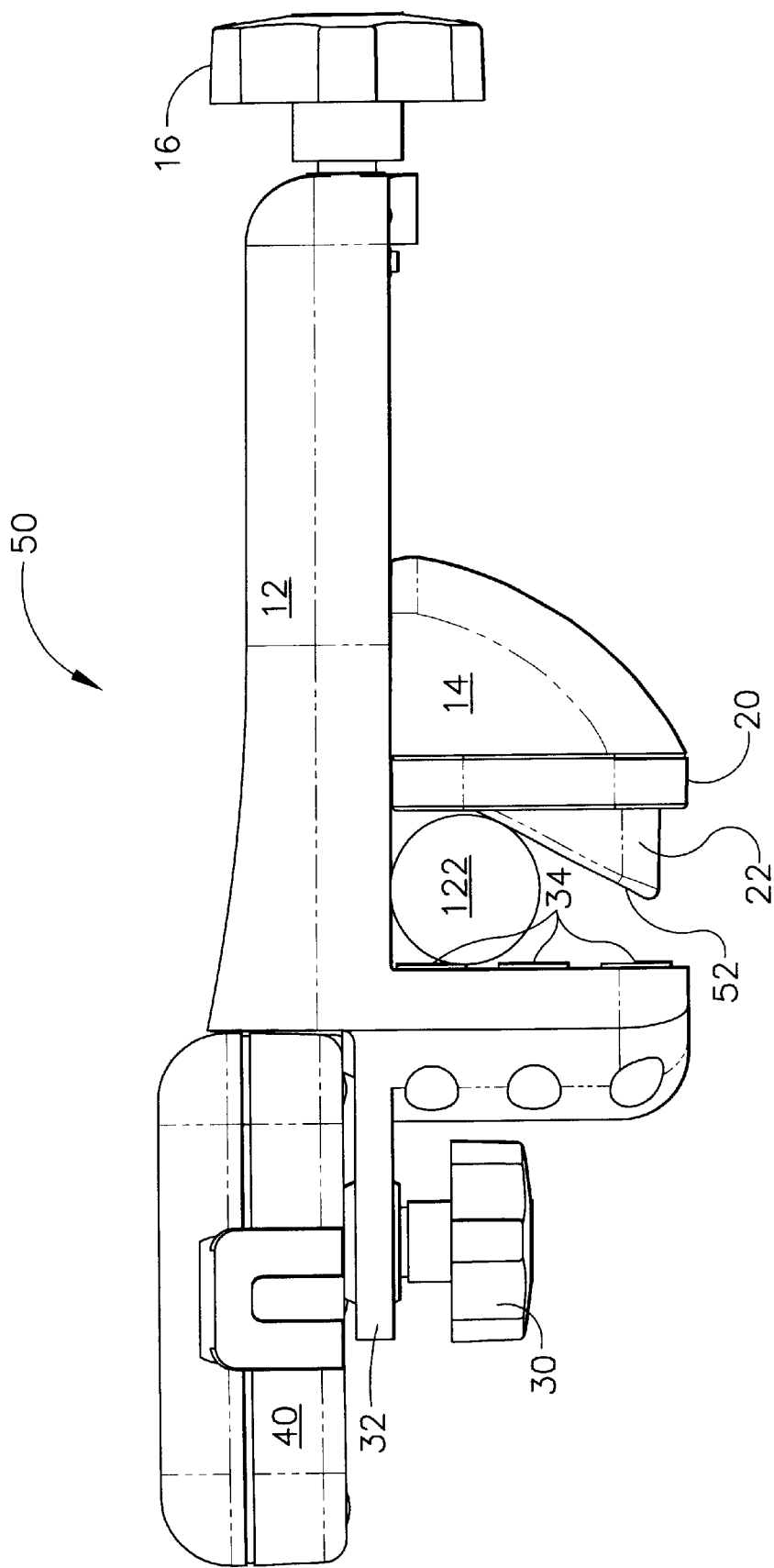
FIG. 14 is a front elevational view of the laser detector clamp apparatus of FIG. 4 in which the reversible jaw adapter is clamped against a small round rod.

FIG. 13 illustrates a perspective view of the same large round rod 120 with the clamp apparatus 50. FIG. 14 shows the clamp apparatus 50 as it might be used with a much smaller round rod, generally designated by the reference numeral 122. In this arrangement, the round rod 122 is still held in place by the ramped face 52, however, it is held by a different portion of that ramped face, and also against a different portion of the rubber bumpers 34.

Figure 15:
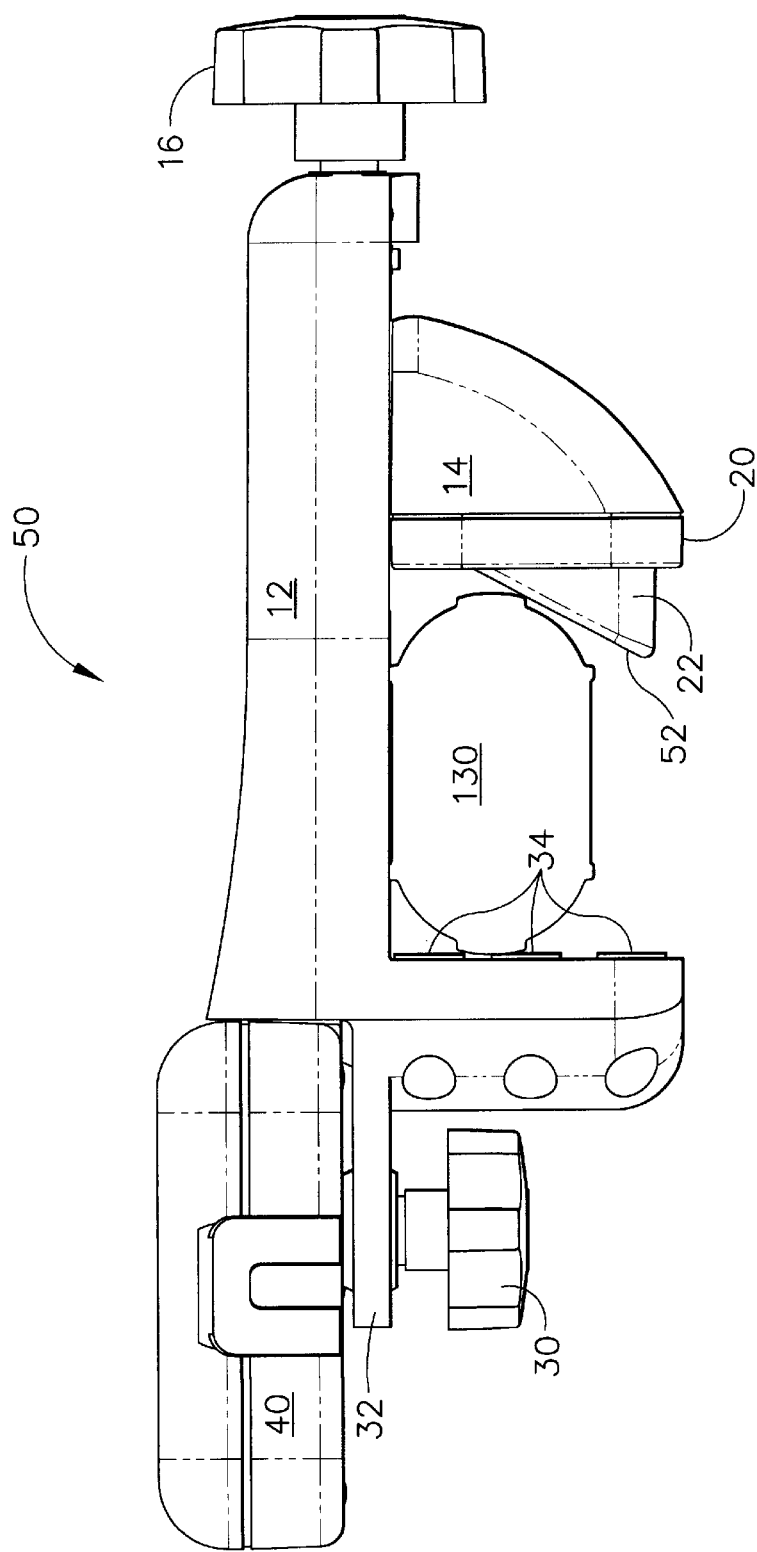
FIG. 15 is a front elevational view of the laser detector clamp apparatus of FIG. 4 in which the reversible jaw adapter is clamped against a large oval rod.
Figure 16:
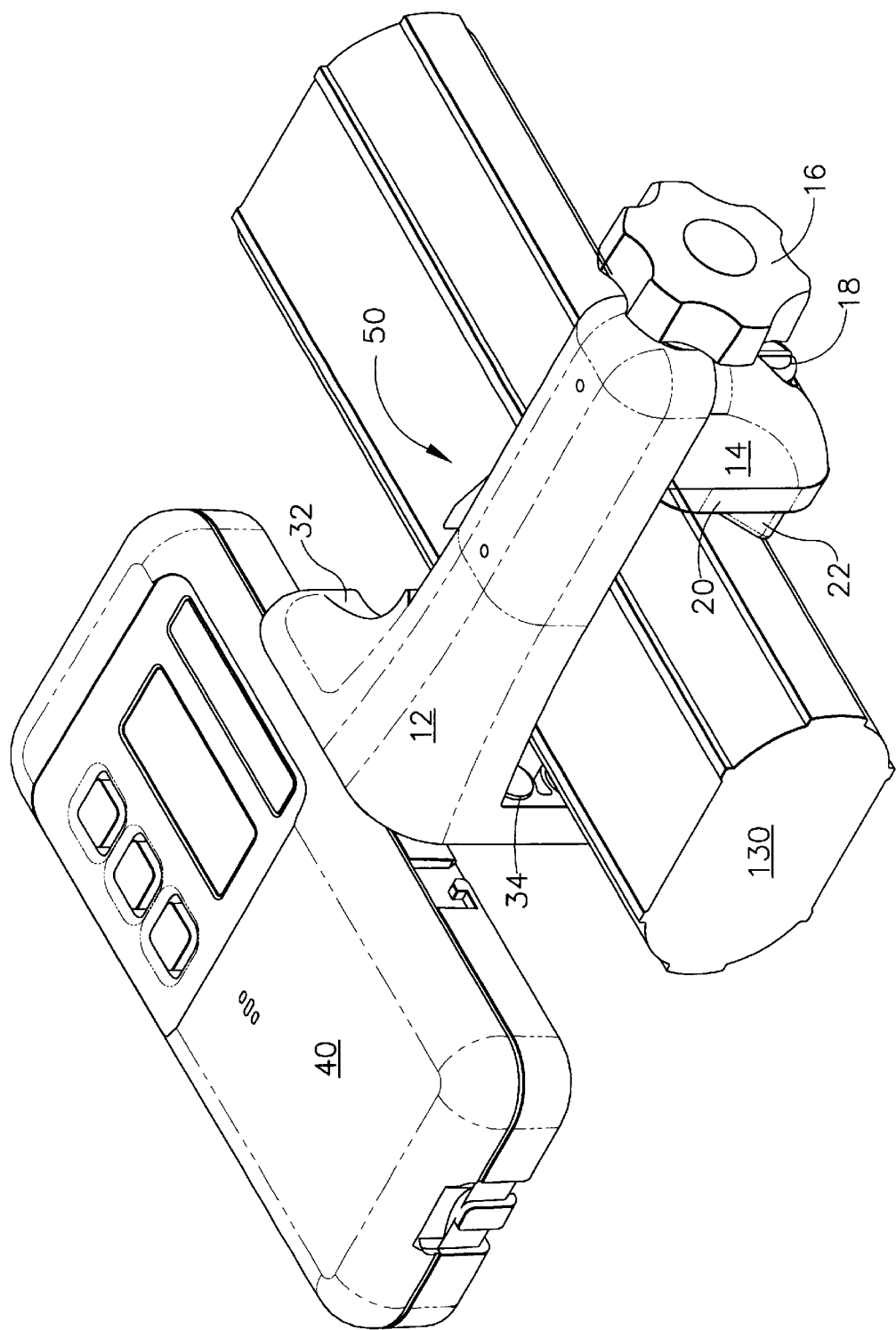
FIG. 16 is a perspective view from the above right of the laser detector clamp apparatus of FIG. 15.

Another example of a structural member that can be used with the clamp apparatus 50 is depicted in FIG. 15, in which a rather large oval rod, generally designated by the reference numeral 130, is held in place between the rubber bumpers 34 and the ramped face 52 of the protrusion 22 of reversible jaw adapter 20. FIG. 16 illustrates a perspective view of this same oval rod 130 as used with the clamp apparatus 50.

Figure 17:
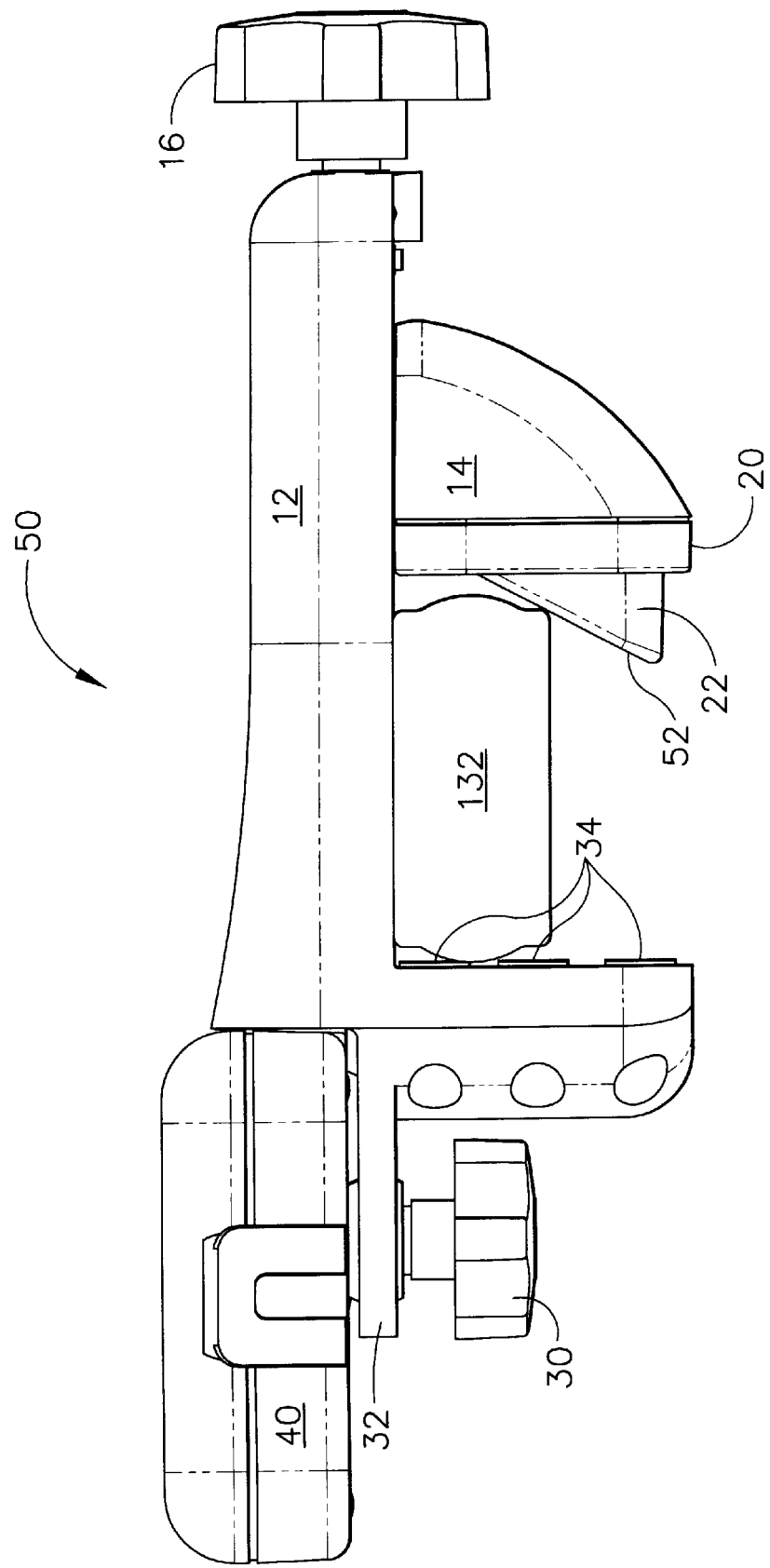
FIG. 17 is a front elevational view of the laser detector clamp apparatus of FIG. 4 in which the reversible jaw adapter is clamped against a small oval rod.

FIG. 17 illustrates the clamp apparatus 50 as used with a smaller oval rod, generally designated by the reference numeral 132. In this arrangement, the smaller oval rod is held in place by a different portion of the rubber bumpers 34 and a different portion of the surface of the ramped face 52.

It will be understood that virtually any type of member shape could be used with one side or the other of the reversible jaw adapter 20, without departing from the principles of the present invention. The only limiting factor would be the size of the opening dimension between the rubber bumpers 34 and the maximum travel of the travelling clamp jaw 14. Of course, this dimension could be always increased by providing a larger laser detector clamp apparatus, which could certainly be done without departing from the principles of the present invention.

It will also be understood that other configurations of the reversible jaw adapter could be constructed without departing from the principles of the present invention. Certainly the slope of the ramped face 52 could be changed, the size of the vertical dimension (as seen in the elevational views) could be changed with respect to the overall size of the clamp apparatus, and finally the actual attaching mechanisms could be changed between the reversible jaw adapter and any different type of travelling member and attaching means, again without departing from the principles of the present invention. As long as a single reversible jaw adapter member was used to provide more than one orientation that can be held in place against some supporting structure or member, then the principles of the present invention would apply to that clamping apparatus.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A clamp apparatus, comprising:
   a main body structure having a first clamping mechanism and a second clamping mechanism, said first clamping mechanism having a jaw mechanism, comprising:
      a travelling clamp jaw that is actuated by a clamp translation mechanism, said travelling clamp jaw being in mechanical communication with a reversible jaw adapter, said reversible jaw adapter having more than one side surface, wherein a first of said side surfaces has a first shape, and a second of said side surfaces has a second shape that is different from said first shape, said reversible jaw adapter being usable for abutting against an exterior object; and
      an end surface that is usable for abutting against an exterior object.

2. The clamp apparatus as recited in claim 1, wherein said reversible jaw adapter is placed against said travelling clamp jaw by use of one of: a screw, a latching mechanism, a snapping arrangement, or a press fit.

3. The clamp apparatus as recited in claim 1, wherein said first shape of the first of said side surfaces is one of a substantially flat, curved, or stepped surface at an orthogonal angle with respect to a direction of movement of said travelling clamp jaw, and wherein said second shape of the second of said side surfaces is one of a substantially flat, curved, or stepped surface at an angle that is not orthogonal with respect to the direction of movement of said travelling clamp jaw.

4. The clamp apparatus as recited in claim 3, wherein said surfaces are either smooth or rough.

5. The clamp apparatus as recited in claim 3, wherein the substantially flat surface of said first shape is at a vertical angle when said direction of movement of the travelling clamp jaw is at a horizontal angle, and wherein the substantially flat surface of said second shape is at a sloped angle that is neither horizontal nor vertical.

6. The clamp apparatus as recited in claim 5, wherein said sloped angle of the substantially flat surface of said second shape is at a positive slope, and the overall shape of said reversible jaw adapter is substantially triangular when viewed from a direction that is transverse to a direction of movement of said travelling clamp jaw.

7. The clamp apparatus as recited in claim 5, wherein said sloped angle of the substantially flat surface of said second shape is at a negative slope, and the overall shape of said reversible jaw adapter is substantially triangular when viewed from a direction that is transverse to a direction of movement of said travelling clamp jaw.

8. The clamp apparatus as recited in claim 3, wherein both the first shape of the first of said side surfaces and the second shape of the second of said side surfaces fit against, or into a space provided by, said travelling clamp jaw.

9. The clamp apparatus as recited in claim 8, wherein said reversible jaw adapter is temporarily removable from said travelling clamp jaw for the purpose of changing an orientation of the reversible jaw adapter with respect to the travelling clamp jaw, such that the first of said side surfaces is moved from contact with said travelling clamp jaw and the second of said side surfaces is then placed into such contact with said travelling clamp jaw, or vice versa.

10. The clamp apparatus as recited in claim 3, wherein said substantially flat surfaces of the first or second of said side surfaces include rubber bumpers, or said end surface includes rubber bumpers.

11. The clamp apparatus as recited in claim 3, wherein said end surface comprises multiple individual surfaces.

12. The clamp apparatus as recited in claim 1, wherein said clamp translation mechanism comprises a clamp lead screw which remains in a single location while said travelling clamp jaw translates toward or away from said end surface, or said clamp lead screw translates along with said travelling clamp jaw as it translates toward or away from said end surface.

13. The clamp apparatus as recited in claim 1, wherein said first clamping mechanism simultaneously holds against a structural member while said second clamping mechanism holds a laser receiver in place.

14. A clamp apparatus, comprising:
a main body structure having a first clamping mechanism and a second clamping mechanism, said first clamping mechanism having a jaw mechanism, comprising:
a travelling clamp jaw that is actuated by a clamp translation mechanism, and which includes a surface that is usable for abutting against an exterior object; and
an end surface that is in mechanical communication with a reversible jaw adapter, said reversible jaw adapter having more than one side surface, wherein a first of said side surfaces has a first shape, and a second of said side surfaces has a second shape that is different from said first shape, said reversible jaw adapter being usable for abutting against an exterior object.

15. The clamp apparatus as recited in claim 14, wherein said reversible jaw adapter is placed against said end surface by use of one of: a screw, a latching mechanism, a snapping arrangement, or a press fit.

16. The clamp apparatus as recited in claim 14, wherein said first shape of the first of said side surfaces is a substantially flat surface at an orthogonal angle with respect to a direction of movement of said travelling clamp jaw, and wherein said second shape of the second of said side surfaces is a substantially flat surface at an angle that is not orthogonal with respect to the direction of movement of said travelling clamp jaw.

17. The clamp apparatus as recited in claim 16, wherein the substantially flat surface of said first shape is at a vertical angle when said direction of movement of the travelling clamp jaw is at a horizontal angle, and wherein the substantially flat surface of said second shape is at a sloped angle that is neither horizontal nor vertical.

18. The clamp apparatus as recited in claim 17, wherein said sloped angle of the substantially flat surface of said second shape is at a positive slope, and the overall shape of said reversible jaw adapter is substantially triangular when viewed from a direction that is transverse to a direction of movement of said travelling clamp jaw.

19. The clamp apparatus as recited in claim 17, wherein said sloped angle of the substantially flat surface of said second shape is at a negative slope, and the overall shape of said reversible jaw adapter is substantially triangular when viewed from a direction that is transverse to a direction of movement of said travelling clamp jaw.

20. The clamp apparatus as recited in claim 16, wherein both the first shape of the first of said side surfaces and the second shape of the second of said side surfaces fit against, or into a space provided by, said end surface.

21. The clamp apparatus as recited in claim 20, wherein said reversible jaw adapter is temporarily removable from said end surface for the purpose of changing an orientation of the reversible jaw adapter with respect to the end surface, such that the first of said side surfaces is moved from contact with said end surface and the second of said side surfaces is then placed into such contact with said end surface, or vice versa.

22. The clamp apparatus as recited in claim 16, wherein said substantially flat surfaces of the first or second of said side surfaces include rubber bumpers, or the abutting surface of said travelling clamp jaw includes rubber bumpers.

23. The clamp apparatus as recited in claim 16, wherein said the abutting surface of said travelling clamp jaw comprises multiple individual surfaces.

24. The clamp apparatus as recited in claim 14, wherein said clamp translation mechanism comprises a clamp lead screw that remains in a single location while said travelling clamp jaw translates toward or away from said end surface, or said clamp lead screw translates along with said travelling clamp jaw as it translates toward or away from said end surface.

25. The clamp apparatus as recited in claim 14, wherein said first clamping mechanism simultaneously holds against a structural member while said second clamping mechanism holds a laser receiver in place.

* * * * *